US011412307B2

(12) United States Patent
Zuo et al.

(10) Patent No.: US 11,412,307 B2
(45) Date of Patent: Aug. 9, 2022

(54) INTERACTION INFORMATION PROCESSING METHOD, CLIENT, SERVICE PLATFORM, AND STORAGE MEDIUM

(71) Applicant: TENCENT TECHNOLOGY (SHENZHEN) COMPANY LIMITED, Shenzhen (CN)

(72) Inventors: Hongtao Zuo, Shenzhen (CN); Chongli Dong, Shenzhen (CN); Hai Huang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 222 days.

(21) Appl. No.: 15/645,846

(22) Filed: Jul. 10, 2017

(65) Prior Publication Data
US 2017/0311039 A1    Oct. 26, 2017

Related U.S. Application Data

(63) Continuation of application No. PCT/CN2016/079876, filed on Apr. 21, 2016.

(30) Foreign Application Priority Data

May 4, 2015 (CN) .......................... 201510222006.8

(51) Int. Cl.
*H04N 21/4722* (2011.01)
*H04N 21/2668* (2011.01)
(Continued)

(52) U.S. Cl.
CPC ....... *H04N 21/4722* (2013.01); *H04N 21/251* (2013.01); *H04N 21/2668* (2013.01);
(Continued)

(58) Field of Classification Search
CPC .. G06F 17/241; G06F 3/0482; G06F 3/04845; G06F 3/04847; G06F 3/04883;
(Continued)

(56) References Cited

U.S. PATENT DOCUMENTS 9,354,763 B2 *    5/2016  Latulipe ............... H04N 21/854
2009/0007200 A1 * 1/2009  Amento ................. H04N 7/173
                                                        715/100

(Continued)

FOREIGN PATENT DOCUMENTS

CN    102547433 A    7/2012
CN    102780921 A    11/2012
(Continued)

OTHER PUBLICATIONS

The Japan Patent Office (JPO) Office Action for Application No. 2018-502311 dated Jul. 2, 2018 10 Pages (including translation).

(Continued)

*Primary Examiner* — Ngoc K Vu
(74) *Attorney, Agent, or Firm* — Anova Law Group, PLLC

(57) ABSTRACT

Embodiments of the present disclosure disclose an interaction information processing method, a client, and a service platform. An interaction information processing method applied to a first account includes: receiving a first information collection operation when playing first multimedia information; responding to the first information collection operation, pausing playing the first multimedia information, and collecting second multimedia information, the second multimedia information being included in a first interaction information; and sending the first interaction information to the service platform, wherein the first interaction information is available being played when the second account plays the first multimedia information. The embodiments of the (Continued)

present disclosure further disclose a computer storage medium.

11 Claims, 6 Drawing Sheets

(51) Int. Cl.
  *H04N 21/25* (2011.01)
  *H04N 21/472* (2011.01)
  *H04N 21/4788* (2011.01)
  *H04N 21/433* (2011.01)

(52) U.S. Cl.
  CPC ... *H04N 21/4788* (2013.01); *H04N 21/47217* (2013.01); *H04N 21/4333* (2013.01)

(58) Field of Classification Search
  CPC ...... G06F 16/954; G06T 11/001; G06T 11/60; G06T 2207/10016; G06T 2207/10024; G11B 27/02; G11B 27/029; G11B 27/031; H04N 7/17309; H04N 21/4126; H04N 21/41407; H04N 21/42203; H04N 21/42204; H04N 21/42213; H04N 21/2393; H04N 21/262; H04N 21/4312; H04N 21/4788; H04N 21/84; H04N 21/858; H04N 5/23245; H04N 5/23293; H04N 21/4722; H04N 21/251; H04N 21/2668; H04N 21/47217
  See application file for complete search history.

(56) References Cited

U.S. PATENT DOCUMENTS

| | | | | |
|---|---|---|---|---|
| 2009/0249223 | A1* | 10/2009 | Barsook | G06F 3/048 |
| | | | | 715/753 |
| 2013/0145248 | A1* | 6/2013 | Friedlander | G06Q 10/107 |
| | | | | 715/230 |
| 2014/0068691 | A1* | 3/2014 | Gao | H04N 21/25875 |
| | | | | 725/110 |
| 2014/0092127 | A1* | 4/2014 | Kruglick | G06F 21/84 |
| | | | | 345/629 |
| 2014/0199046 | A1* | 7/2014 | Lindsey | G06T 11/60 |
| | | | | 386/244 |
| 2014/0226953 | A1* | 8/2014 | Hou | H04N 21/4325 |
| | | | | 386/230 |
| 2015/0089372 | A1* | 3/2015 | Mandalia | H04N 21/47217 |
| | | | | 715/720 |
| 2015/0113058 | A1* | 4/2015 | Zhang | H04L 65/403 |
| | | | | 709/204 |

FOREIGN PATENT DOCUMENTS

| | | |
|---|---|---|
| CN | 102905170 A | 1/2013 |
| CN | 103997676 A | 8/2014 |
| CN | 103997688 A | 8/2014 |
| CN | 104010222 A | 8/2014 |
| CN | 104125512 A | 10/2014 |
| CN | 104935980 A | 9/2015 |
| JP | 2003259306 A | 9/2003 |
| JP | 2006331297 A | 12/2006 |
| JP | 2013118649 A | 6/2013 |
| WO | 2014057636 A1 | 4/2014 |
| WO | 2015038338 A1 | 3/2015 |

OTHER PUBLICATIONS

The World Intellectual Property Organization (WIPO) International Search Report for PCT/CN2016/079876 dated Jul. 26, 2016.
The State Intellectual Property Office of the People's Republic of China (SIPO) Office Action 1 for 201510222006.8 dated Jun. 23, 2017.
The Japan Patent Office (JPO) Office Action 2 for Application No. 2018-502311 dated Feb. 12, 2019 5 Pages (including translation).
Jazuoh Sake, "it was not supposed to be like this About book I read and what I saw on the net Mac App Store: SoundCloud", Jan. 18, 2011, Retrieved from the Internet: URL: https://jazuoh.blogs pot.com/2011/01/mac-app-store-soundcloud.html 10 Pages (including translation).
Social Sound Scrap, "[Part 2] Listen to songs, let's comment", May 21, 2011, Retrieved from the Internet: URL: http://fourcranes.blogspot.com/2011/05/blog-post.html. 8 Pages (including translation).
Akiko Nagasawa, "Web-Nomi I tried it! Music sharing service "SoundCloud"", Jul. 15, 2014, Retrieved from the Internet: URL: https://www.web-nomi.com/promotion/20140715/ 6 Pages (including translation).
Noalot, "How to use free music cloud service "SoundCloud"", Feb. 17, 2013, Retrieved from the Internet: URL: https://ameblo.jp/noalot/entry-11472398375.html> 11Pages (including translation).
The State Intellectual Property Office of the People's Republic of China (SIPO) Office Action 1 for 201510222006.8 dated Feb. 12, 2018 9 Pages (including translation).

* cited by examiner

INTERACTION INFORMATION PROCESSING METHOD, CLIENT, SERVICE PLATFORM, AND STORAGE MEDIUM

CROSS-REFERENCES TO RELATED APPLICATIONS

This application is a continuation application of PCT Patent Application No. PCT/CN2016/079876, filed on Apr. 21, 2016, which claims priority to Chinese Patent Application No. 201510222006.8, entitled "INTERACTION INFORMATION PROCESSING METHOD, CLIENT, SERVICE PLATFORM, AND STORAGE MEDIUM" filed on May 4, 2015, the entire contents of both of which are incorporated herein by reference.

FIELD OF THE TECHNOLOGY

The present disclosure relates to the field of information processing technologies, and in particular, to an interaction information processing method, a client, a service platform, and a storage medium.

BACKGROUND OF THE DISCLOSURE

With the development of information technologies, when following multimedia information, a user also desires to interact. In order to enhance interaction, the existing technology provides bullet screen information based on video playing. The bullet screen information is information formed based on watching feedback information generated after the user watches multimedia information. Usually, after a piece of bullet screen information is formed, the bullet screen information is displayed together with the multimedia information when the multimedia information is subsequently played.

However, in the existing technology, bullet screen information is text information manually entered by using a physical keyboard or a virtual keyboard. When the user watches the multimedia information in a full screen and needs to enter bullet screen information, the user needs to use the physical keyboard or invokes the virtual keyboard on the display screen. This method for forming the bullet screen information leads to complicated operations of the user. Especially, for mobile user equipment with a relatively small screen, such as a mobile phone, it is more difficult for the user to enter information by using the virtual keyboard when the user watches multimedia information in full screen. Consequently, enthusiasm of the user for interacting based on the watched multimedia information is dampened.

SUMMARY

In view of this, embodiments of the present disclosure provide an interaction information processing method, a client, and a service platform, which at least can resolve some of the foregoing problems.

The technical solutions of the embodiments of the present disclosure are as follows:

A first aspect of the embodiments of the present disclosure provides an interaction information processing method including: receiving, by a first terminal, a first information collection operation when playing first multimedia information; in response to the first information collection operation, pausing playing the first multimedia information, and collecting, by the first terminal logged in with a first account, second multimedia information, the second multimedia information being included in the first interaction information; and sending the first interaction information to a service platform. Further, the first interaction information is available for being inserted and played when a second account plays the first multimedia information.

A second aspect of the embodiments of the present disclosure provides an interaction information processing method, applied to a service platform, the method including: receiving second multimedia information associated with first multimedia information sent by a first account, the second multimedia information being included in a first interaction information; and sending the first interaction information to a second account that is playing or that is going to play the first multimedia information. Further, the first interaction information is available for being inserted and played when the second account plays the first multimedia information.

A third aspect of the embodiments of the present disclosure provides an interaction information processing method, including: receiving, by a second terminal logged in with a second account, first interaction information sent by a service platform, the first interaction information including second multimedia information sent by a first account; and inserting the first interaction information during a process of playing first multimedia information.

A fourth aspect of the embodiments of the present disclosure provides a client, a first account running on the client, the client including: a first interaction unit, configured to receive a first information collection operation when playing first multimedia information; a first responding unit, configured to respond to the first information collection operation, pause playing the first multimedia information, and collect second multimedia information, the second multimedia information being a composition part of first interaction information; and a first sending unit, configured to send the first interaction information to a service platform. Further, the first interaction information is available for being inserted and played when a second account plays the first multimedia information.

A fifth aspect of the embodiments of the present disclosure provides a service platform, the service platform including: a first receiving unit, configured to receive second multimedia information associated with first multimedia information and that is sent by a first account, the second multimedia information being a composition part of first interaction information; and a second sending unit, configured to send the first interaction information to a second account that is playing or that is to play the first multimedia information, the first interaction information being inserted when the second account plays the first multimedia information.

A sixth aspect of the embodiments of the present disclosure provides a client, a second account running on the client, the client including: a second receiving unit, configured to receive first interaction information sent by a service platform, the first interaction information including second multimedia information sent by a first account; and a playing unit, configured to insert the first interaction information during a process of playing first multimedia information.

A seventh aspect of the embodiments of the present disclosure further provides a computer storage medium, the computer storage medium storing a computer executable instruction, and the computer executable instruction being used for executing at least one of the interaction information processing methods described above.

An eighth aspect of the embodiments of the present disclosure further provides an interaction information processing system, including the client applied to the first account, the client applied to the second account, and the service platform described above.

In the interaction information processing method, the client, the service platform, and the computer storage medium in the embodiments of the present disclosure, collected interaction information is multimedia information. Collection of the interaction information based on a multimedia information playing process is more convenient, thereby simplifying operations of a user, improving use satisfaction of the user, and improving interaction enthusiasm of the user for interacting when watching multimedia information.

DESCRIPTION OF EMBODIMENTS

The technical solutions of the present disclosure are further described below in detail with reference to the accompanying drawings of the description and embodiments. It should be understood that the preferred embodiments described below are merely used for describing and explaining the present disclosure, and are not used for limiting the present disclosure.

Method Embodiment 1

Figure 1:
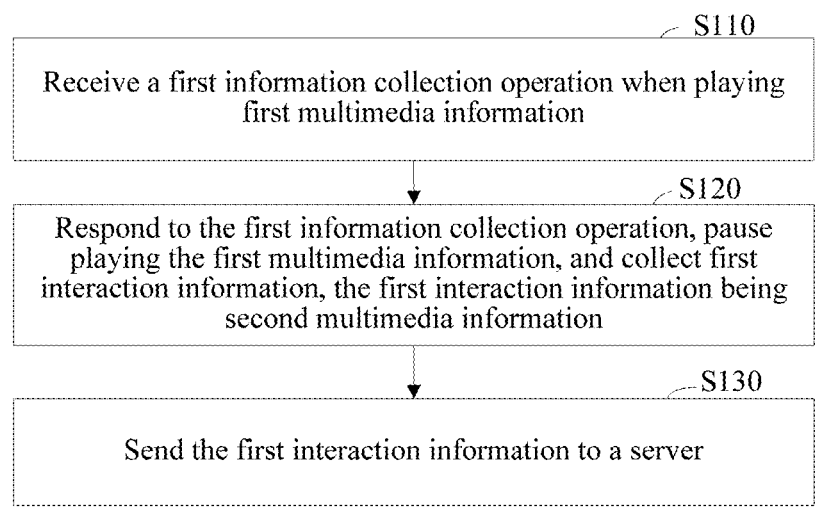
FIG. 1 is a first schematic flowchart of an interaction information processing method according to an embodiment of the present disclosure.

As shown in FIG. 1, this embodiment provides an interaction information processing method, applied to a first account (e.g., a first terminal). The method includes:

Step S110: Receiving a first information collection operation when playing first multimedia information.

Step S120: In response to the first information collection operation, pause playing the first multimedia information, and collect (e.g., by the first terminal logged in with the first account) second multimedia information, the second multimedia information being a composition part of the first interaction information. That is, the first interaction information includes the second multimedia information. For example, the first terminal may generate the first interaction information based on at least one of: the second multimedia information, account information of the first account, playing attribute information corresponding to the second multimedia information, etc.

Step S130: Sending the first interaction information to a service platform.

The first interaction information is inserted when a second account plays the first multimedia information. In other words, the first interaction information is available for being played when a second terminal logged in with a second account plays the first multimedia information. Inserting the first interaction information when playing the first multimedia information, as used herein, may refer to pause playing the first multimedia information and play the second multimedia information included in the first interaction information.

For example, the first terminal may receive a request (e.g., by a user input) to record an audio comment when streaming a video at a preferred progress timestamp. In response to the request, the first terminal may pause the video, record the audio comment, and send the audio comment and related information (e.g., progress timestamp, first account information) to a service platform. Further, when a second terminal logged in with a second account is playing the same video, the second terminal may receive the audio comment and the related information and displays an indication of the audio comment (e.g., in a progress bar of the video playing interface, or other locations on the video playing interface) during a specific time window or during the entire playtime of the video. When receiving a request for accessing the audio comment, the second terminal may pause playing the video and play the audio comment.

In this embodiment, the first account is an account used by a user to log into a multimedia information player or a playing website.

In this embodiment, after the first account is logged into by means of a client, the first account can play the first multimedia information. The first multimedia information may include video information or audio information, such as films, TV series, variety shows, short plays, or other multimedia information.

There are multiple specific operations of step S110:

Operation 1: When the first multimedia information is played, an information collection key may be displayed on an output interface of the first multimedia information. The information collection operation is that the user clicks or slides the information collection key, and it indicates that the user subsequently needs to send interaction information. A client on which the first account runs opens a collection element such as a microphone or a camera to collect voice information and/or image information input by the user.

Operation 2: The information collection key may also be a physical key on the client. The physical key may be a key, such as buttons of various forms or a sensor, on the client on which the first account runs.

Operation 3: Certainly, the client may not include a physical key or a virtual key for triggering interaction information collection, and may determine, by receiving a voice collection instruction input by the user, whether to execute an operation of collecting interaction information. For example, specifically, when the first account is playing the first multimedia information, an audio collection unit of the client remains in an open state, to collect voice input by the user. When designated voice is collected, it is considered that the information collection operation is received.

Operation 4: When the client on which the first account runs collects a specific gesture of the user, it is determined that the information collection operation is received. In this case, an operation gesture of the user is collected by means of an image collection unit or an infrared sensing unit.

Two operations are executed in step S120. One is pausing playing the first multimedia information, that is, suspending playing of the first multimedia information; the other is collecting the second multimedia information during a period of pausing playing the first multimedia information.

The collecting the second multimedia information in this embodiment may include collecting audio information and/or collecting image information. Certainly, when the second multimedia information may include only one of image information or audio information, because the second multimedia information including only the audio information has less information amount that the second multimedia information including the image information, and interaction traffic may be reduced, the second multimedia information may include at least the audio information. In addition, if a current user has hearing disorder, image collection is performed on the sign language input by the user. In this way, the formed second multimedia information may include only image information. Usually, the image information may be dynamic image information that includes at least two frames, such as a video.

When the first multimedia information is played, an image may be displayed and/or voice may be played. In order to facilitate bullet screen information collection, playing of the first multimedia information is paused, so that the client collects the second multimedia information with low noise. In this way, the first interaction information formed on the service platform based on the second multimedia information has a better output effect. Certainly, during specific implementation, besides the second multimedia information, the first interaction information may further include information of other types such as text information.

The first interaction information may be any information that the user desires to express when the user watches the first multimedia information, for example, watching feedback of the user after the user watches the first multimedia information, comments on the first multimedia information, or current feelings of the user.

Obviously, compared with that the user manually enters the interaction information, voice input or image collection of the interaction information enables user operations to be more convenient, simplifies the user operations, and can improve interaction enthusiasm of the user, so as to improve an interaction effect.

Figure 2:
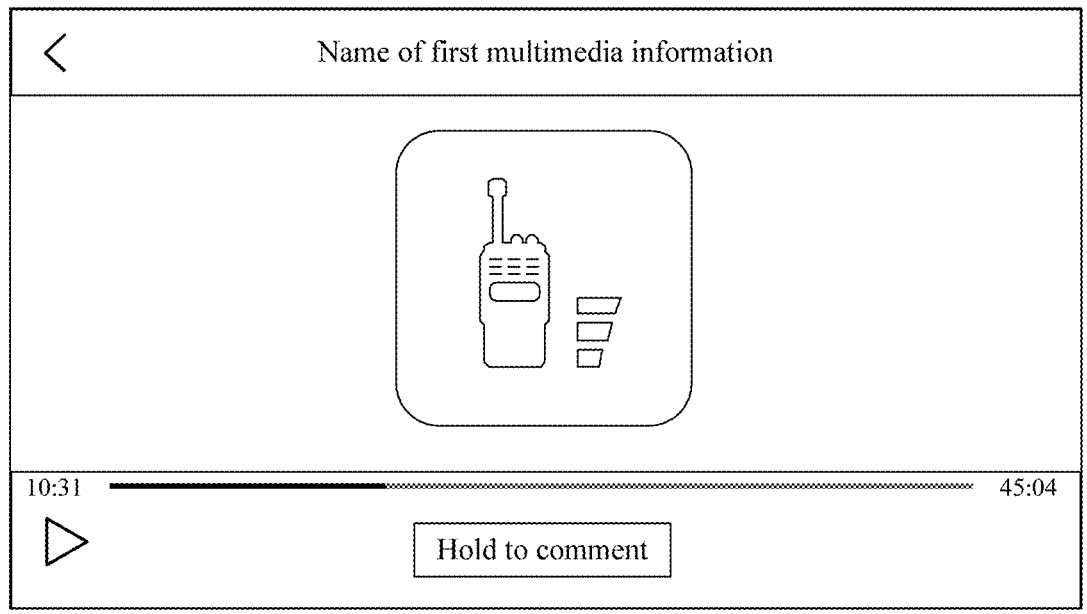
FIG. 2 is a first schematic diagram of an interaction information processing effect according to an embodiment of the present disclosure.

FIG. 2 is a schematic diagram of collecting the second multimedia information. A virtual key "Hold to comment" is displayed in FIG. 2. When an electronic device detects that the virtual key is clicked, it is considered that the information collection operation is received, and collection of the second multimedia information is started.

When the first multimedia information is video information, during collection of the second multimedia information, in a playing area of playing the first multimedia information, an icon "Collecting" is displayed, which indicates that it is currently in a collection state of the second multimedia information. Identification information of the first multimedia information such as a name of the first multimedia information is displayed on a playing state column above the playing area, to indicate multimedia information to which the second multimedia information of the user is subsequently inserted. A playing progress bar is displayed in FIG. 2. Time on the left of the playing progress bar represents played duration, and duration on the right represents total duration required for playing the first multimedia information in a standard speed. The progress bar visually displays, by using colors, a relationship between the total duration and the played duration.

In FIG. 2, time 10:31 on the left indicates that the first multimedia information has been played for 10:31, and the total duration is 45:04.

When the virtual key is displayed, in order not to occupy the playing area of the first multimedia information, the virtual key is displayed below the playing progress bar. Meanwhile, this setting also satisfies a usual habit of the user for performing a playing control operation on the first multimedia information, and facilitates use by the user.

Finally, the client on which the first account runs sends the second multimedia information to the service platform, and the service platform performs operations such as storing.

During a specific implementation process, the identification information of the first multimedia information and insertion time are sent together with the first interaction information. The insertion time is time of the first interaction information relative to a playing progress of the first multimedia information. As shown in FIG. 2, the first interaction information is collected and formed when the first multimedia information is played to the duration of 10:31. The time is the insertion time, and is sent to the service platform together with the first multimedia information. Subsequently, when the service platform sends the first interaction information to the first multimedia information, the first interaction information is inserted when the first multimedia information is played to the duration of 10:31. Therefore, during specific implementation, the method further includes: recording played time of the first multimedia information when pausing playing the first multimedia information, forming the insertion time, and sending the insertion time and the first interaction information to the service platform in step S130. Certainly, the insertion time is preset time of inserting the first interaction information when the second account plays the first multimedia information. During a specific implementation process, the first interaction information is not limited to being inserted during the insertion time. Specifically, for example, based on a user operation of the second account, the first interaction information is inserted in advance, and the playing time of the first interaction information is not the insertion time.

The insertion in this embodiment is inserting and playing, for example, pausing playing the first multimedia information, playing the first interaction information, and continuing playing the first multimedia information after completing playing the first interaction information.

First, in the interaction information processing method provided in this embodiment, multimedia information is first exchanged, so as to break limitation that in the existing technology, bullet screen information includes only simple text information, enrich forms of interaction information, and provide a better interaction effect by exchanging the multimedia information.

Secondly, in the interaction message exchanging method in this embodiment, collection of the multimedia information is not simply inputting text information by means of keyboards, an information collection manner is more intelligent, and user operations are more simple, thereby simplifying the user operations, improving use satisfaction and interaction enthusiasm of the user.

Method Embodiment 2

As shown in FIG. 1, this embodiment provides an interaction information processing method, applied to a first account. The method includes:

Step S110: Receiving a first information collection operation when playing first multimedia information.

Step S120: Responding to the first information collection operation, pause playing the first multimedia information, and collect second multimedia information, the second multimedia information being a composition part of the first interaction information.

Step S130: Sending the first interaction information to a service platform.

The first interaction information is inserted when a second account plays the first multimedia information.

The method further includes: sending identification information of the first account playing the first multimedia information to the service platform, the identification information of the first account being used for the service platform to determine the second account to which the first interaction information is to be sent, and the first account and the second account being accounts that have a social relationship.

The first multimedia information in the service platform may be clicked by many users for playing. Some users may know each other, and some may be strangers. The users currently watching the first multimedia information may not desire to interact with strangers, so that normal watching of the users may not be disturbed. In this embodiment, the first account also sends the identification information of the first account to the service platform. The identification information may represent identity information of a user, and a social relationship of the user may be queried based on the identity information. The social relationship may indicate a direct social relationship and an indirect social relationship. Specifically, for example, an account A and an account B have a direct social relationship established by acquaintances, the account A and an account C have an indirect social relationship, and the account A and the account C are social friends of the account B. This indirect social relationship may be a social relationship formed between the first account and the second account via a designated quantity of accounts, and the designated quantity is usually one or two.

Specifically, for example, a user plays the first multimedia information in the QQ video player, and the user uses logs in by using a QQ number. The QQ number is a type of the first account. At this time, the first account also sends the QQ number to the service platform. Subsequently, when sending the first interaction information, the service platform queries a QQ friend according to the QQ number, and selects a friend QQ number of the QQ number as a second account for receiving the first interaction information. The QQ friend here is a type of the foregoing social relationship.

The first account may also be a WeChat account. The social relationship further includes WeChat friends, WeChat moments, or the like of the WeChat account.

Certainly, the first account may also be another account that can be used for playing unit multimedia information and can perform social contact, and is not limited to the foregoing QQ number or WeChat account.

In this way, subsequently, it is convenient for the service platform to pertinently send the first interaction information, to avoid disturbing normal watching of other users, implement pertinent interaction, improve the interaction feeling of information interaction, and meanwhile, ensure play quality when the first multimedia information is played.

Method Embodiment 3

Figure 3:
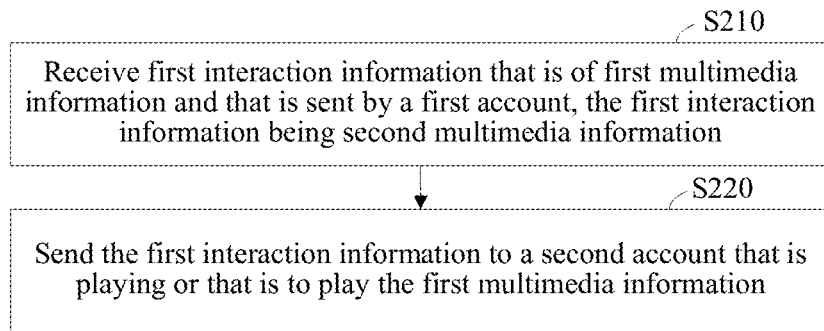
FIG. 3 is a second schematic flowchart of an interaction information processing method according to an embodiment of the present disclosure.

As shown in FIG. 3, this embodiment provides an interaction information processing method, applied to a service platform. The method includes:

Step S210: Receiving first interaction information associated with first multimedia information sent by a first account, the first interaction information including second multimedia information.

Step S220: Sending the first interaction information to a second account that is playing or that is about to play the first multimedia information.

The first interaction information is inserted when the second account plays the first multimedia information.

In this embodiment, the first interaction information received by the service platform from the first account is multimedia information, and is not plain text information in the existing technology.

Moreover, the first interaction information in this embodiment is information inserted when the second account plays the first multimedia information. For relevant description of insertion, refer to Method Embodiment 1, and details are not described herein again.

In the interaction information processing method in this embodiment, interaction is made when the first multimedia information is played, and interaction is made by using multimedia information instead of the interaction information of the plain text information in the existing technology, to improve interaction effects. An insertion manner is used instead of an interaction manner in the existing technology in which bullet screen information is floatingly displayed on a display picture of the first multimedia information. In conclusion, the interaction manner can simplify user interaction operations and improve interaction experience and interaction enthusiasm.

Related descriptions of the first multimedia information and the second multimedia information in this embodiment are the same as those in the foregoing embodiment, and details are not described herein again.

Method Embodiment 4

As shown in FIG. 3, this embodiment provides an interaction information processing method, applied to a service platform. The method includes:

Step S210: Receiving first interaction information associated with first multimedia information and that is sent by a first account, the first interaction information including second multimedia information.

Step S220: Sending the first interaction information to a second account that is playing or that is to play the first multimedia information.

The first interaction information is inserted when the second account plays the first multimedia information.

Figure 4:
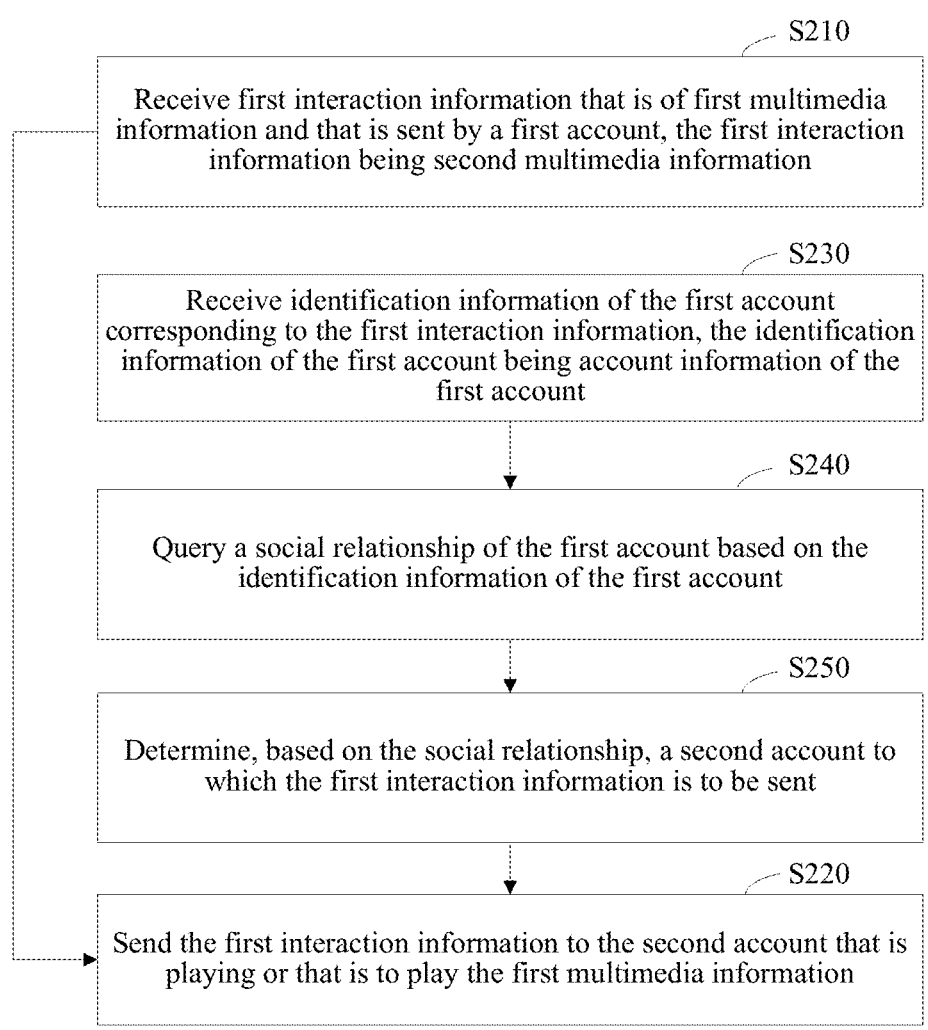
FIG. 4 is a third schematic flowchart of an interaction information processing method according to an embodiment of the present disclosure.

As shown in FIG. 4, the method further includes the following.

Step S230: Receiving identification information of the first account corresponding to the first interaction information, the identification information of the first account being account information of the first account.

Step S240: Querying a social relationship of the first account based on the identification information of the first account.

Step S250: Determining, based on the social relationship, the second account to which the first interaction information is to be sent.

The first account and the second account are accounts that have a social relationship.

During a specific implementation process, the received identification information of the first account in step S230 may be received together with the first interaction information.

In this embodiment, a social relationship of the first account is queried according to the identification information of the first account, so as to determine the second account that has a social relationship with the first account.

During a specific implementation process, the second account that satisfies a particular social relationship may be further determined. Specifically, for example, the first account and the second account are QQ friends and a frequency of interaction between the first account and the second account reaches a predetermined frequency, or QQ friends whose intimacy reaches a predetermined value, and not all QQ friends can receive the first account information sent by the first account.

In the information processing method in this embodiment, the social relationship of the first account is queried, and the first interaction information is pertinently sent to the second account, so that users having a social relationship can pertinently interact with each other, so as to improve interaction experience.

During a specific implementation process, the service platform may send the first interaction information and the first multimedia information to the second account, or may separately send the first interaction information and the first multimedia information. Specifically, for example, the service platform may first send the first multimedia information, and then send the first interaction information when receiving a request, sent by the second account, for the first interaction information.

Certainly, the first interaction information may be the second multimedia information that is automatically played when the second account plays the first multimedia information, or may be the second multimedia information inserted based on a user operation. For example, a user A uses the second account to play the first multimedia information, and views, on a playing progress bar of the first multimedia information, attribute information of the first interaction information sent by a friend. The user A clicks a display area of the attribute information to instruct the second account to play the first interaction information. If the second account currently does not receive the first interaction information, the second account also requests, based on the click of the user A, the service platform to send the first interaction information.

The attribute information may include information such as playing duration information of the first interaction information, and identification information such as an avatar or a nickname of the first account. Therefore, the display area of the attribute information is also used as a virtual tool for receiving a user instruction to play the interaction information. An information form of the attribute information may be one or more of text information, picture information, or other displayable information.

Figure 6:
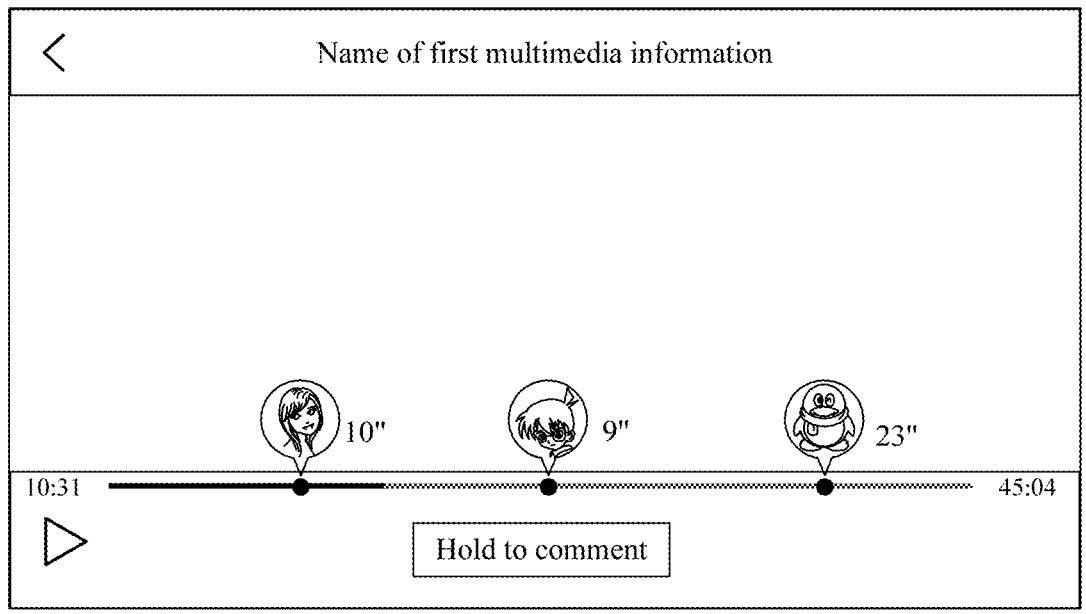
FIG. 6 is a second schematic diagram of an interaction information processing effect according to an embodiment of the present disclosure.

In addition, the attribute information may be merely used for displaying prompt information for notifying the user that the first interaction information is to be inserted when the first multimedia information is played. To conveniently notify the user of insertion time of the first interaction information, the attribute information is shown in FIG. 6, and the attribute information is displayed on a position corresponding to the insertion time on the playing progress bar of the first multimedia information.

During specific implementation, the service platform also receives information such as the identification information associated with the first multimedia information and that is sent by the first account, and the insertion time of the first interaction information.

In conclusion, in the interaction information processing method provided in this embodiment, a user conveniently makes multimedia information interaction when watching a video, thereby improving intelligence of a service platform and user interaction satisfaction.

Method Embodiment 5

Figure 5:
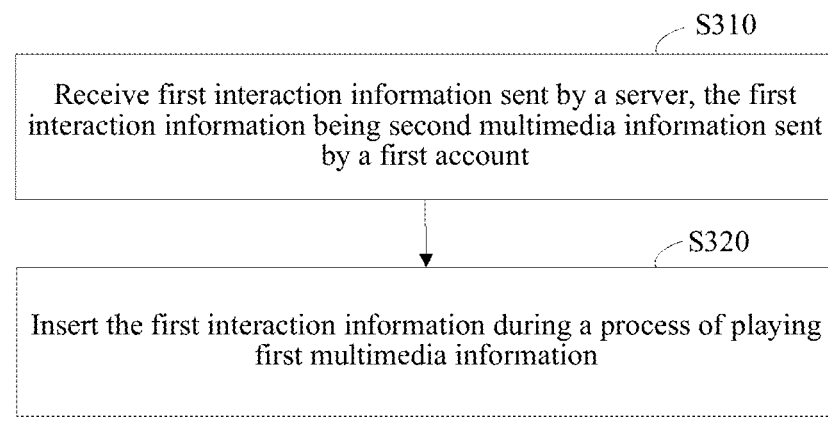
FIG. 5 is a fourth schematic flowchart of an interaction information processing method according to an embodiment of the present disclosure.

As shown in FIG. 5, this embodiment provides an interaction information processing method, applied to a second account. The method includes:

Step S310: Receiving first interaction information sent by a service platform, the first interaction information including second multimedia information sent by a first account.

Step S320: Inserting the first interaction information during a process of playing first multimedia information.

The insertion here is pausing playing the first multimedia information, playing the first interaction information, and then, continuing playing the first multimedia information after completing playing the first interaction information.

In the interaction information processing method provided in this embodiment, when playing first multimedia information or receiving first multimedia information, a second account also receives first interaction information sent by a service platform, and after receiving the first interaction information, the second account insert the first interaction information during a process of playing the first multimedia information.

It should be noted that the first account and the second account in the present application may be accounts running on different clients or may be accounts running on a same client.

For the first multimedia information, the first interaction information, the first account, and the second account, refer to descriptions of foregoing method embodiments, and details are not described herein again. In conclusion, in the interaction information processing method provided in this embodiment, the first interaction information received by the second account no longer is plain text information, but is multimedia information, so that interaction effects can be improved. Meanwhile, an interaction manner is insertion rather than that bullet screen information is displayed on a display area of first multimedia information in an overlapping manner, and this insertion manner may further implement better interaction.

Method Embodiment 6

As shown in FIG. 5, this embodiment provides an interaction information processing method, applied to a second account. The method includes:

Step S310: Receiving first interaction information sent by a service platform, the first interaction information including second multimedia information sent by a first account.

Step S320: Inserting the first interaction information during a process of playing first multimedia information.

The method further includes: when playing the first multimedia information, displaying attribute information of the first interaction information; and detecting an interaction information playing operation for the attribute information.

Step S320 may include: pausing playing the first multimedia information and inserting the first interaction information based on a first interaction information playing operation.

The attribute information may include information about an account generating the first interaction information (that is, the account information of the first account). The account information may include avatar information, nickname information, duration information, and information about an information format of the first interaction information. The information format here may include whether the first interaction information is audio information or video information.

FIG. 6 is a display effect diagram of the first interaction information. FIG. 6 displays an account avatar of the first account and playing duration of the first interaction information displayed beside the account avatar. In FIG. 6, the attribute information is displayed above the playing progress bar. During specific implementation, the attribute information may also be displayed on other display areas, for example, below the playing progress bar, and the display area may be an area other than the display area of the first multimedia information.

In this way, a user may input, by means of a mouse or an operation such as touching, the interaction information playing operation to a client on which the second account runs. For example, a pressure sensing unit is disposed on a display unit of the client on which the second account runs. The user may apply pressure by touching or even blowing the display area displaying the attribute information, to complete input of the interaction information playing operation.

In this embodiment, after receiving the interaction information playing operation, the second account inserts the first interaction information, so that the user can better control whether the first interaction information is played and control insertion time, thereby improving use satisfaction of the user. Certainly, the first interaction information may also be automatically inserted according to the insertion time determined by the service platform. In this way, the second account may also receive information such as the insertion time from the service platform.

In addition, the client of the second account may also send a first interaction information obtaining request to the service platform after detecting the interaction information playing operation, and receive the first interaction information sent by the service platform based on the obtaining request. The method for receiving the first interaction information based on the obtaining request can reduce an information interaction amount between the service platform and the client when the client does not detect the interaction information playing operation.

Figure 7:
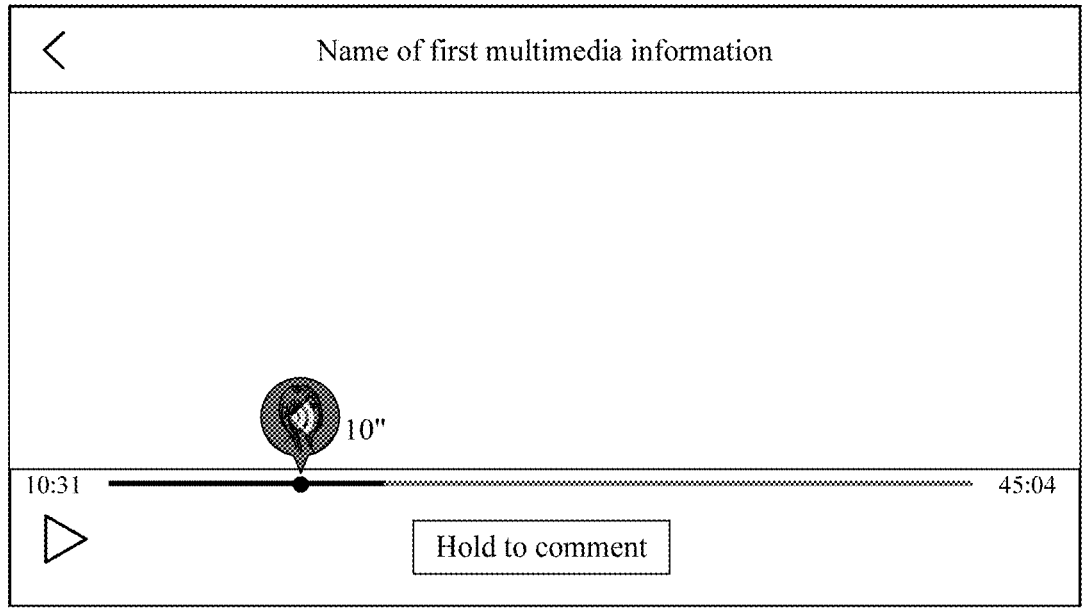
FIG. 7 is a third schematic diagram of an interaction information processing effect according to an embodiment of the present disclosure.

FIG. 7 is a schematic diagram showing that the second account plays the first interaction information. The first interaction information shown in FIG. 7 includes audio information. When the first interaction information is played, in order to notify an account that forms the currently displayed first interaction information, display parameters of the attribute information of the corresponding first interaction information change, such as color parameters and icon parameters. Playing of the first multimedia information is paused and the first interaction information is played.

If the first interaction information is a video, playing of the first multimedia information is paused, and the first interaction information is played by using the display area of the first multimedia information.

In conclusion, the interaction information processing method provided in this embodiment has an advantage of a better interaction effect.

In addition, attribute information may be displayed in the following manner: After a client detects a request input by a user, the request is sent from a service platform, the attribute information sent by the service platform based on the request is received, and the attribute information is then displayed.

Method Embodiment 7

As shown in FIG. 5, this embodiment provides an interaction information processing method, applied to a second account. The method includes:

Step S310: Receiving first interaction information sent by a service platform, the first interaction information including second multimedia information sent by a first account.

Step S320: Inserting the first interaction information during a process of playing first multimedia information.

The second account and the first account are accounts that have a social relationship.

In this embodiment, the second account and the first account are accounts based on a social relationship, thereby avoiding invalid information exchanging between strange accounts, reducing interference, caused by interaction information sent by a strange account, to the user during a process of playing the first multimedia information, improving user satisfaction in an information exchanging process, and ensuring satisfaction of the user watching the first multimedia information.

Method Embodiment 8

Figure 8:
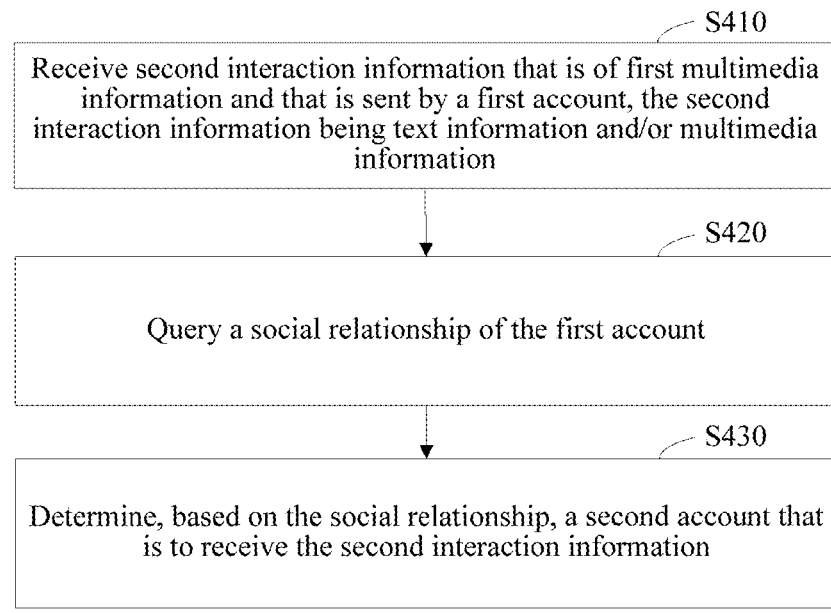
FIG. 8 is a fifth schematic flowchart of an interaction information processing method according to an embodiment of the present disclosure.

As shown in FIG. 8, this embodiment provides a bullet screen information interaction method. The method includes:

Step S410: Receiving second interaction information associated with first multimedia information and that is sent by a first account, the second interaction information being text information and/or multimedia information.

Step S420: Querying a social relationship of the first account.

Step S430: Determining, based on the social relationship, a second account that is to receive the second interaction information.

The first account and the second account are accounts that have a social relationship.

An interaction information processing method in this embodiment is an information processing method applied to a service platform.

The second interaction information in this embodiment may be text information, or multimedia information, or a combination of text information and multimedia information.

The social relationship may be a QQ friend relationship, a WeChat friend relationship, a Microblog friend relationship, a classmate relationship, or any other social relationship mentioned in the foregoing method embodiments.

In step S430, the determining the second account may specifically include: querying the social relationship of the first account, obtaining an account, and using the account as the second account, or may include: determining whether an account obtained by querying meets a predetermined social relationship condition, and determining the account as the second account when the account meets the predetermined social relationship condition. The social relationship condition is, for example, whether intimacy of QQ friends meets a preset intimacy condition, whether a quantity of interaction within a designated time reaches a designated quantity, or whether an interaction frequency reaches a predetermined frequency.

In this embodiment, the service platform queries the social relationship of the first account, determines, based on the social relationship, the second account that is to receive the second interaction information, thereby implementing pertinence of interaction made when first multimedia information is played, reducing interference caused by interaction between strange accounts to the first multimedia information. Meanwhile, pertinent interaction improves interaction experience.

As a further improvement of this embodiment, the method further includes: sending attribute information of the second interaction information to the second account, the attribute information being displayed when the second account plays the first multimedia information.

The attribute information may include information such as playing duration and an information amount of the second interaction information, and account information of the first account. These attribute information may represent parameters of the second interaction information or attribute parameters of the first account forming the second interaction information.

Therefore, after receiving the second interaction information, the second account may conveniently determine, according to the attribute information, whether to play or display the second interaction information.

The display area of the attribute information may also be used by the second account to receive an interaction information output operation input by the user, so that the second account receives the interaction information output operation to determine whether to output the second interaction information, or request, based on the interaction information output operation, the service platform to send the second interaction information. In this way, the service platform sends the second interaction information based on the request. The interaction information output operation in this embodiment may include an interaction information playing operation in the foregoing method embodiments, and may also include an interaction information display operation.

Device Embodiment 1

Figure 9:
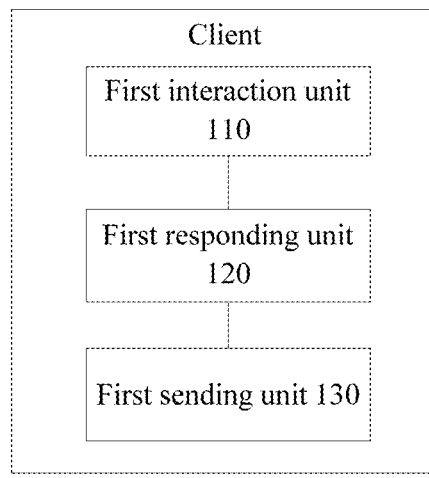
FIG. 9 is a first schematic structural diagram of a client according to an embodiment of the present disclosure.

As shown in FIG. 9, this embodiment provides a client. A first account runs on the client and the client includes: a first interaction unit 110, configured to receive a first information collection operation when playing first multimedia information; a first responding unit 120, configured to respond to the first information collection operation, pause playing the first multimedia information, and collect second multimedia information, the second multimedia information being a composition part of first interaction information; and a first sending unit 130, configured to send the first interaction information to a service platform. Further, the first interaction information is available for being inserted and played when a second account plays the first multimedia information.

The client may be any electronic device that can output multimedia information, for example, a mobile phone, a tablet computer, a notebook computer, a desktop computer, or a network television.

A specific structure of the first interaction unit 110 may be human-computer interaction interfaces of various types. The human-computer interaction interface may be a keyboard and a mouse, a voice interaction interface, or may be of an interaction structure such as touch control or floating touch control.

A specific structure of the first responding unit 120 may include processors of various types, for example, a central processing unit (CPU), an application processor (AP), a microprocessor CPU, a digital signal processor (DSP), a programmable array PLC, or another specific structure. The processor may pause playing the first multimedia information by executing a predetermined code. Meanwhile, the first responding unit 120 may include a multimedia information collection module, such as an image collection module and/or an audio collection module. The image collection module may include a structure such as a camera or a camera, and the audio collection module may include a structure such as a voice recorder.

A specific structure of the first sending unit 130 may include communications interfaces of various types, such as an optical cable communications interface or a cable communications interface, or may include a structure such as a transmit antenna.

The first interaction information may include at least one of audio information and/or image information. For detailed descriptions of the first interaction information, the first multimedia information, the first account, and the second account, refer to Method Embodiment 1, and details are not described herein again. In conclusion, the client in this embodiment can provide implementation hardware for implementing Method Embodiment 1, and also has an advantage of improving an information interaction effect and use satisfaction of a user.

Device Embodiment 2

As shown in FIG. 9, this embodiment provides a client. A first account runs on the client and the client includes: a first interaction unit 110, configured to receive a first information collection operation when playing first multimedia information; a first responding unit 120, configured to respond to the first information collection operation, pause playing the first multimedia information, and collect second multimedia information, the second multimedia information being a composition part of first interaction information; and a first sending unit 130, configured to send the first interaction information to a service platform, the first interaction information being available for insertion playing (e.g., cut-in play) when a second account plays the first multimedia information.

The first sending unit 130 is further configured to send identification information of the first account playing the first multimedia information to the service platform.

The identification information of the first account is used for the service platform to determine the second account to which the first interaction information is to be sent, and the first account and the second account are accounts that have a social relationship.

In this embodiment, the first sending unit 130 also sends the identification information of the first account to the service platform, so that the service platform can pertinently send the first interaction information by querying a social relationship of the first account, so as to exchange interaction information based on the social relationship, thereby improving an information interaction effect and user satisfaction.

Device Embodiment 3

Figure 10:
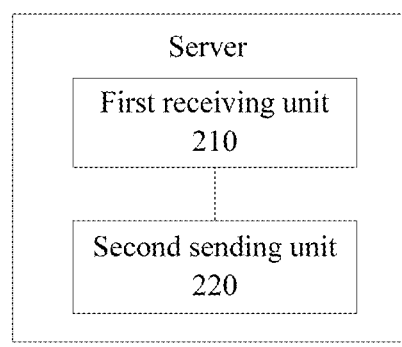
FIG. 10 is a first schematic structural diagram of a server according to an embodiment of the present disclosure.

As shown in FIG. 10, this embodiment provides a service platform. The service platform includes: a first receiving unit 210, configured to receive second multimedia information associated with first multimedia information and that is sent by a first account, the second multimedia information being a composition part of first interaction information; and a second sending unit 220, configured to send the first interaction information to a second account that is playing or that is to play the first multimedia information, the first interaction information is available for being inserted and played when the second account plays the first multimedia information.

The service platform may be any electronic device located on a network side. A specific structure of the first receiving unit 210 may include receiving interfaces of various types, for example, a wired cable interface, an optical cable interface, or a wireless air interface.

An interface of the second sending unit 220 may also include receiving interfaces of various types, for example, a wired cable interface, an optical cable interface, or a wireless air interface.

The first receiving unit 210 and the second sending unit 220 may be integrated into a same communications interface that has a receiving function and a transmit function at the same time.

The first interaction information may include audio information and/or image information. For detailed descriptions of the first multimedia information and the first interaction information, refer to the foregoing embodiments. In conclusion, the service platform in this embodiment may be configured to implement the interaction information processing method in Method Embodiment 3, and also has advantages of a good information interaction effect and high user satisfaction.

Device Embodiment 4

As shown in FIG. 10, this embodiment provides a service platform. The service platform includes: a first receiving unit 210, configured to receive second multimedia information associated with first multimedia information and that is sent by a first account, the second multimedia information being a composition part of first interaction information; and a second sending unit 220, configured to send the first interaction information to a second account that is playing or that is to play the first multimedia information, wherein the first interaction information is available for being inserted and played when the second account plays the first multimedia information.

The first receiving unit 210 is further configured to receive identification information of the first account corresponding to the second multimedia information.

The service platform further includes: a first query unit, configured to query a social relationship of the first account based on the identification information of the first account; and a first determining unit, configured to determine, based on the social relationship, the second account to which the first interaction information is to be sent, the first account and the second account being accounts that have a social relationship.

Specific structures of the first query unit and the first determining unit may also correspond to processors of various types, and for structures of the processors, refer to Device Embodiment 1.

In conclusion, the service platform in this embodiment is a further improvement of the foregoing service platform in the device embodiment. The first query unit and the first determining unit are disposed, so that the first interaction information can be pertinently sent to the second account, and mutual interference between strange accounts is avoided.

During a specific implementation process, the second sending unit of the service platform is further configured to send attribute information of the first interaction information to the second account. The attribute information includes playing duration information of the first interaction information and/or account information of the first account.

Device Embodiment 5

Figure 11:
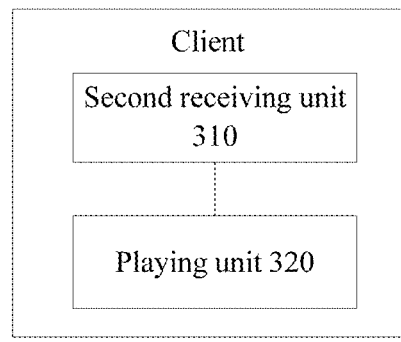
FIG. 11 is a second schematic structural diagram of a client according to an embodiment of the present disclosure.

As shown in FIG. 11, this embodiment provides a client. A second account runs on the client and the client includes: a second receiving unit 310, configured to receive first interaction information sent by a service platform, the first interaction information being second multimedia information sent by a first account; and a playing unit 320, configured to insert the first interaction information during a process of playing first multimedia information.

The client in this embodiment may be a mobile phone, a PC, a tablet computer, or any electronic device that can play multimedia information. For related descriptions of the second account, the first account, the first multimedia information, and the second multimedia information, refer to the foregoing embodiments, and details are not described herein again.

The second receiving unit 310 in this embodiment may include receiving interfaces of various types, such as a receive antenna, a cable interface, an optical cable interface, or another interface having a receiving function.

A specific structure of the playing unit 320 may include a structure such as a display screen or an audio player, and can play the first multimedia information and the second multimedia information.

In conclusion, the client in this embodiment is a client on which the second account runs. During a specific implementation process, the first account and the second account may run on one client, that is, the first account and the second account are logged into by using one client simultaneously.

As a further improvement of this embodiment, the playing unit 320 is further configured to display attribute information of the first interaction information when playing the first multimedia information.

The client further includes: a second interaction unit, configured to detect an interaction information playing operation for the attribute information.

The playing unit 320 is configured to pause playing the first multimedia information and insert the first interaction information based on a first interaction information playing operation.

A specific structure of the second interaction unit may include human-computer interaction interfaces of various types, and is similar to that of the first interaction unit.

The attribute information may include information such as playing duration and gist information of the first interaction information, and account information of the first account such as an account avatar.

In this embodiment, the second interaction unit is added to the client, so that a user controls, according to needs of the user, whether the client plays the first interaction information and when to insert the first interaction information, so as to improve user controllability and user satisfaction.

Certainly, during specific implementation, the client may also automatically insert the first interaction information in an insertion time according to default configuration.

During application, usually, a user is more interested in interaction information sent by a known person or a familiar friend, and sometimes, may consider interaction information sent by a stranger, as interference. In order to reduce mutual interference between strange users and improve use satisfaction of the user, the second account and the first account in this embodiment are accounts that have a social relationship. Obviously, in this way, interaction enthusiasm, validity, and sociability can be improved.

Device Embodiment 6

Figure 12:
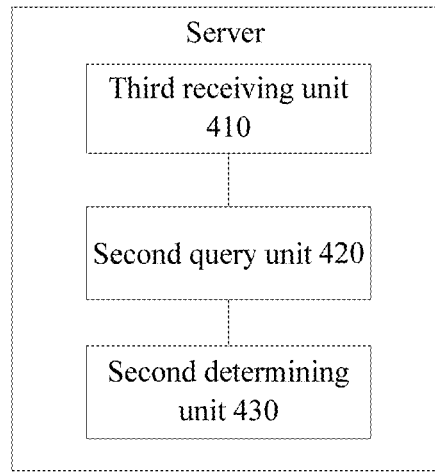
FIG. 12 is a second schematic structural diagram of a server according to an embodiment of the present disclosure.

As shown in FIG. 12, this embodiment provides a service platform. The service platform includes: a third receiving unit 410, configured to receive second interaction information associated with first multimedia information and that is sent by a first account, the second interaction information being text information or multimedia information; a second query unit 420, configured to query a social relationship of the first account; and a second determining unit 430, configured to determine, based on the social relationship, a second account that is to receive the second interaction information, the first account and the second account being accounts that have a social relationship.

The service platform provided in this embodiment is usually located on a transit device in a network and is an intermediate device of a client on which the first account runs and a client on which the second account runs. The service platform in this embodiment and the service platform providing the first multimedia information may be a same service platform, or the service platform in this embodiment and the service platform on which a social relationship between the first account and the second account is established may be a same service platform.

In any embodiment of the present application, the service platform includes at least a server, or may include multiple server groups that are disposed in a centralized manner or in a distributed manner.

The third receiving unit 410 in this embodiment may be receiving interfaces of various types, for example, a wireless interface, a cable interface, or an optical cable interface.

Specific structures of the second query unit 420 and the second determining unit 430 may include processors of various types that have an information processing function, for example, a CPU, an AP, a microprocessor MCU, a DSP, a programmable array, or another processor having an information processing function.

In conclusion, the service platform provided in this embodiment can implement exchange of second interaction information based on a social relationship in a time when first multimedia information is played, thereby improving pertinence of two interaction parties when the first multimedia information is playing, reducing interference between strange accounts, and improving satisfaction of user experience and intelligence of an electronic device.

In yet another embodiment, the present disclosure further provides an interaction information processing system, including the client applied to the first account described above, the client applied to the second account described above, and the service platform described above.

It should be noted that interaction time of the first interaction information and the second interaction information in any embodiment of the present application is within a time range in which the first multimedia information is played. Specifically, generation times of the first interaction information and the second interaction information are extracted within a playing time range of the first multimedia information, and the playing of the first multimedia information may be paused when the interaction information is extracted. The first interaction information and the second interaction information are inserted within the playing time range of the first multimedia information. Usually, the interaction information is generated based on the first multimedia information, and an association relationship is established between the formed interaction information and the first multimedia information. If the second account does not play the first multimedia information, the first interaction information sent by the first account cannot be received. During specific implementation, the first account may also send interaction prompt information to the second account on a social platform based on the social relationship between the first account and the second account. The interaction prompt information is used for prompting the second account to play the first multimedia information. The interaction prompt information may include identification information, such as a uniform resource address or a title, of the first multimedia information.

Two specific examples are provided in the following with reference to any of the foregoing embodiments.

Example 1

In this example, based on convenience of voice input, an input entrance of video comments is placed on a playing window. In this way, a user may input video comments in a playing scenario, and input information is voice information. The user starts inputting by pressing and holding a voice input button, and complete inputting by releasing the button. During an entire input process, a system continuously collects and encodes audio input information of a microphone, and after the input ends, delivers the audio information to a service platform for storing. The delivered information includes at least account information of an account, identification information of a current video, and a playing location of the current video.

During an entire video playing process, a client needs to pull comment information of the video from the service platform periodically, and pull accounts (such as friends or friends of a friend) in a relationship link of a social relationship according to the social relationship of the accounts (this is not limited to social platforms, and is determined according to respective service characteristics). Related information such as attribute information of the comments on the video is displayed on a user interface, as shown in FIG. 6. When the client receives and clicks a voice comment, the client automatically pauses playing the current video, plays the audio information, and resumes playing the video after completing playing the audio information.

Example 2

A preparing step: entering an online player, and logging into an account. After logging into a client, the client stores identification information of the account, for example, an identification code or a login Cookie. The player plays first multimedia information, for example, plays a video, and correspondingly, can obtain identification information of the first multimedia information, for example, a video ID of the currently played video. The online player may be an online video player. The online player may be a player that currently establishes a communications connection with a service platform.

Step (1): Sending a voice comment request of a video to a comment delivery server in the service platform, which is equivalent to requesting to output the first interaction information or the second interaction information.

Step (2): The comment delivery server in the service platform queries a relationship link of a social relationship of the account according to account information of the account. In this case, a relationship link query server returns a relationship link query result to the comment delivery server. Usually, the relationship link query server stores a relationship link list of social relationships of the accounts.

Step (3): Meanwhile, the service platform queries, in a historical-comment database of the video according to the relationship link query result of the relationship link, whether an account that has a social relationship with the account forms comment data information; forms a final query result; and returns the final query result to the client on which the online video player runs.

Step (4): Returning the final query result of the query to the client, the returned information including at least audio information (such as a storage path of an audio file) of a comment, a name of a friend (an avatar or gender), a current video playing time point when the comment is generated, and a comment time of the comment. The client displays related information after receiving the information. If the comment information is clicked, playing of the current video is paused, then the current audio comment is played, and playing of the video is resumed after the playing of the audio comment ends. The comment information here may be the foregoing first interaction information or second interaction information. The current video is the foregoing first multimedia information.

Figure 13:
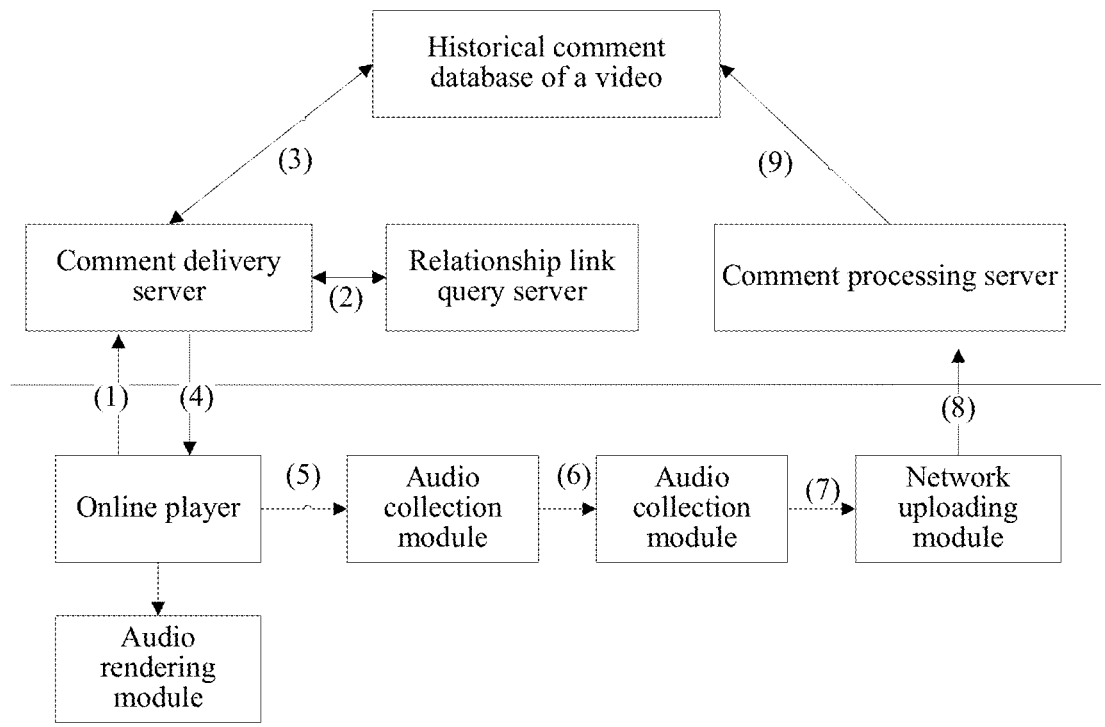
FIG. 13 is a sixth schematic flowchart of an interaction information processing method according to an embodiment of the present disclosure.

Step (5): Collecting an operation of clicking a comment button by a user, start collecting audio comments based on the operation, and if the user does not log in, guide the user to log into the account, or display a related prompt that an account is not logged into. Specifically, for example, a login dialog box pops up, or a login dialog window pops up. The operation of clicking the comment button here is equivalent to the foregoing interaction information collection operation. Here, an audio collection module in FIG. 13 is triggered to enter a collection ready state.

Step (6): After the account is logged into, the audio collection module opens a microphone to collect audio information.

Step (7): Performing audio encoding on the collected audio information. The audio information here may be equivalent to the foregoing first interaction information or second interaction information.

Step (8): After stopping inputting the interaction information, uploading a finally encoded audio file to a comment processing server by using a network uploading module. Usually, information uploaded together with the audio file includes: identification information of the account, identification information of a video, and a current video playing time point. The current video playing time point here is equivalent to the foregoing insertion time.

Step (9): After receiving the comment information including the foregoing audio file, the comment processing server stores related information to the historical-comment database of the video.

An audio rendering module in FIG. 13 is used for rendering audio data.

In the several embodiments provided in the present application, it should be understood that the disclosed device and method may be implemented in other manners. The described device embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections of composition parts may be implemented through some interfaces. The indirect couplings or communication connections between the devices or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing module, or each of the units may be separately used as one unit alone, or two or more units are integrated into one unit. The integrated unit may be implemented in a form of hardware, or may be implemented in a form of hardware in addition to a software functional unit.

A person of ordinary skilled in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a removable storage device, a read-only memory (ROM), a random access memory (RAM), a magnetic disk, or an optical disc.

This embodiment of the present disclosure further provides a computer storage medium, the computer storage medium stores a computer executable instruction, and the computer executable instruction is used for executing at least one of the interaction information processing methods provided in any foregoing embodiment, for example, executing one or more of the methods shown in FIG. 1, FIG. 3, FIG. 4, FIG. 5, and FIG. 8. The computer storage medium provided in this embodiment of the present disclosure may be the foregoing storage media of various types, and optically, is a non-instantaneous storage medium.

The foregoing descriptions are merely specific implementation manners of the present invention, but are not intended to limit the protection scope of the present invention. It should be understood that modifications made according to principles of the present disclosure shall fall within the protection scope of the present disclosure.

What is claimed is:

1. An interaction information processing method, comprising:

receiving, by a first terminal logged in with a first account, an information collection operation while playing first multimedia information;

in response to receipt of the information collection operation, pausing playing the first multimedia information at a progress timestamp;

while having the playing of the first multimedia information paused, collecting, by the first terminal, second multimedia information, the second multimedia information including at least one of audio information and video information and including identification information of the first account;

while the playing of the first multimedia information is being paused and the second multimedia information is being collected, displaying in a playing area an icon indicative of information collection, the playing area being an area the first multimedia information is played in; and sending, by the first terminal, the second multimedia information to a service platform, wherein the service platform inserts the second multimedia information into a video content of the first multimedia information at the progress timestamp to generate updated first multimedia information, wherein the service platform performs a query on social relationship of the first account using the identification information of the first account to identify a second account which is in social relationship with the first account, and to identify a third account which is not in social relationship with the first account, wherein the service platform sends the updated first multimedia information to a second terminal logged in with the second account, and the service platform avoids sending the updated first multimedia information to a third terminal logged in with the third account, and wherein while playing of the updated first multimedia information at the second terminal reaches the progress timestamp, the second multimedia information of the updated first multimedia information is automatically played while the first multimedia information of the updated first multimedia information is being paused, and playing of the first multimedia information of the updated first multimedia information automatically continues after playing of the second multimedia information is completed.

2. The interaction information processing method according to claim 1, wherein an identifier identifying the first multimedia information is displayed in a playing area while the second multimedia information is collected, the playing area being an area the first multimedia information is played in.

3. The interaction information processing method according to claim 1, wherein the second multimedia information is collected through a press-n-hold input button located on the first terminal.

4. The interaction information processing method according to claim 3, wherein a playing area is situated above a playing progress bar, and the press-n-hold information input button is situated below the playing progress bar, the playing area being an area the first multimedia information is played in.

5. The method according to claim 1, wherein the first and the second multimedia information is each played in a full screen at the second terminal.

6. The method according to claim 1, wherein attribute information of the second multimedia information is displayed while the updated first multimedia information is played at the second terminal, and wherein a color parameter of the attribute information changes to indicate that the first terminal is where the second multimedia information is formed.

7. An interaction information processing method, applied to a service platform, comprising:

receiving second multimedia information associated with first multimedia information from a first terminal logged in with a first account, the second multimedia information including at least one of audio information and video information and including identification information of the first account, wherein the second multimedia information is collected by the first terminal while playing of the first multimedia information arrives at a progress timestamp, playing of the first multimedia information is being paused while the second multimedia information is being collected, and an icon indicative of information collection is displayed in a playing area while the playing of the first multimedia information is being paused and the second multimedia information is being collected, the playing area being an area the first multimedia information is played in;

inserting the second multimedia information into a video content of the first multimedia information at the progress timestamp to generate updated first multimedia information;

performing a query on social relationship of the first account using the identification information of the first account to identify a second account which is in social relationship with the first account, and to identify a third account which is not in social relationship with the first account; and sending the updated first multimedia information to a second terminal logged in with the second account, and avoiding sending the updated first multimedia information to a third terminal logged in with the third account, wherein while playing of the updated first multimedia information at the second terminal reaches the progress timestamp, the second multimedia information of the updated first multimedia information is automatically played while the first multimedia information of the updated first multimedia information is being paused, and playing of the first multimedia information of the updated first multimedia information automatically continues after playing of the second multimedia information is completed.

8. A client logged in with a first account, comprising: a memory, and a processor configured to:

receive an information collection operation while playing first multimedia information;

respond to the information collection operation;

pause playing the first multimedia information at a progress timestamp;

while having the playing of the first multimedia information paused, collect second multimedia information, the second multimedia information including at least one of audio information and video information and including identification information of the first account;

while the playing of the first multimedia information is being paused and the second multimedia information is being collected, display in a playing area an icon indicative of information collection, the playing area being an area the first multimedia information is played in; and send the second multimedia information to a service platform, wherein the service platform inserts the second multimedia information into a video content of the first multimedia information at the progress timestamp to generate updated first multimedia information, wherein the service platform performs a query on social relationship of the first account using the identification information of the first account to identify a second account which is in social relationship with the first account, and to identify a third account which is not in social relationship with the first account, wherein the service platform sends the updated first multimedia information to a second terminal logged in with the second account, and the service platform avoids sending the updated first multimedia information to a third terminal logged in with the third account, and wherein while playing of the updated first multimedia information at the second terminal reaches the progress timestamp, the second multimedia information of the updated first multimedia information is automatically played while the first multimedia information of the updated first multimedia information is being paused, and playing of the first multimedia information of the updated first multimedia information automatically continues after playing of the second multimedia information is completed.

9. A client logged in with a second account, comprising: a memory, and a processor configured to:

receive second multimedia information originated by a first terminal logged in with a first account and sent by a service platform, the second multimedia information including at least one of audio information and video information and including identification information of the first account, wherein the second multimedia information is collected by the first terminal while playing of a first multimedia information arrives at a progress timestamp and playing of the first multimedia information is being paused while the second multimedia information is being collected, wherein an icon indicative of information collection is displayed in a playing area while the playing of the first multimedia information is being paused and the second multimedia information is being collected, the playing area being an area the first multimedia information is played in, and wherein the service platform inserts the second multimedia information into a video content of the first multimedia information at the progress timestamp to generate updated first multimedia information, wherein the service platform performs a query on social relationship of the first account using the identification information of the first account to identify a second account which is in social relationship with the first account, and to identify a third account which is not in social relationship with the first account, and wherein the service platform sends the updated first multimedia information to a second terminal logged in with the second account, and the service platform avoids sending the updated first multimedia information to a third terminal logged in with the third account; and play the updated first multimedia information, wherein while playing of the updated first multimedia information at the second terminal reaches the progress timestamp, the second multimedia information of the updated first multimedia information is automatically played while the first multimedia information of the updated first multimedia information is being paused, and playing of the first multimedia information of the updated first multimedia information automatically continues after playing of the second multimedia information is completed.

10. The client according to claim 9, wherein the processor is further configured to:

display attribute information of the second multimedia information while playing the first multimedia information, wherein a color parameter of the attribute information changes to indicate that the first terminal is where the second multimedia information is formed.

11. An information presentation system, comprising:

the client according to claim 8; and the service platform configured to:

receive the second multimedia information associated with first multimedia information sent by the first account; and send the second multimedia information to the second account that is playing or that is to play the first multimedia information.

* * * * *